H. C. WALLACE.
PULLEY.
APPLICATION FILED JUNE 28, 1920.
1,432,814.
Patented Oct. 24, 1922.
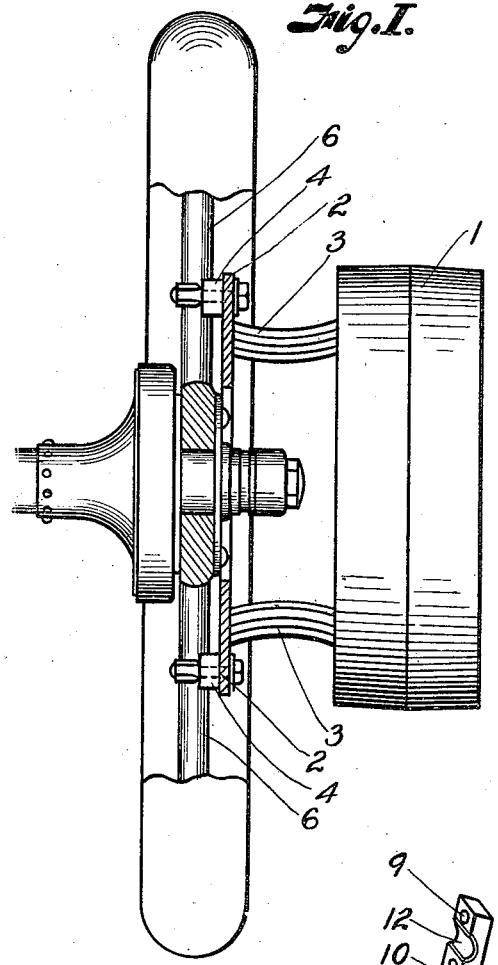
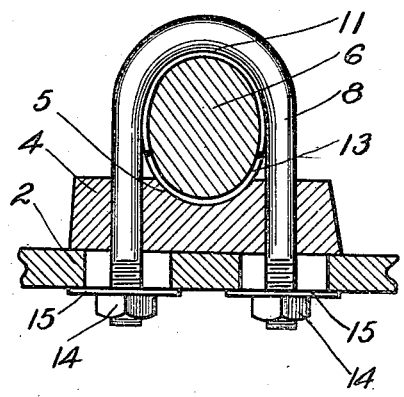
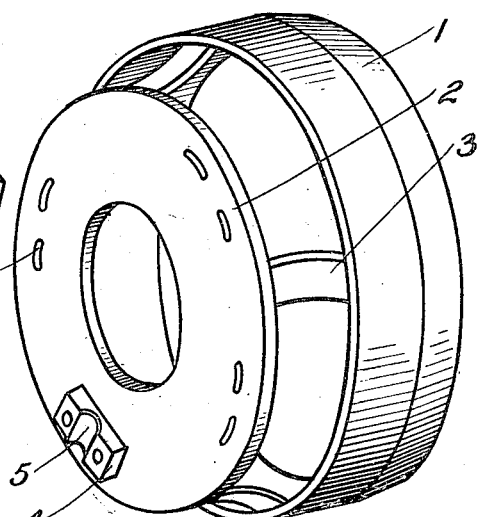
INVENTOR
Halbert C. Wallace
BY
ATTORNEY Patented Oct. 24, 1922.

1,432,814

UNITED STATES PATENT OFFICE.

HALBERT C. WALLACE, OF KANSAS CITY, MISSOURI.

PULLEY.

Application filed June 28, 1920. Serial No. 392,172.

*To all whom it may concern:*

Be it known that I, HALBERT C. WALLACE, a citizen of the United States, residing at Kansas City, in the county of Jackson and State of Missouri, have invented certain new and useful Improvements in Pulleys; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to pulleys particularly adapted to be attached to a spoked driven wheel, for example, the driven wheel of a motor vehicle, so that the power of the motor vehicle may be transmitted to a driven element for industrial purposes.

One of the objects of the invention is to provide a pulley which may be easily and expeditiously attached to the spokes of a wheel and as conveniently removed therefrom.

The invention consists in providing a pulley with an attaching ring having spoke-engaging seats or jaws, one of which is fixed to the ring, the remaining seats being adjustable to accommodate for wheels having different numbers of spokes. I prefer to shackle the seats or jaws to the spokes by removable fastening devices, such as U-shaped spoke clips having relatively wide seating portions, there being preferably a winding or packing strip about the spokes at the points of connection with the pulley so that the paint on the spokes will not be marred when the pulley is being applied or detached therefrom.

In the drawings,

Fig. I is a view partly in section and partly in elevation, showing a driving wheel to which the pulley is attached.

Fig. II is a cross sectional view through the attaching plate of the pulley and a spoke-engaging lug, the shackle being shown in elevation, and Fig. III is a detail, perspective view of the pulley, showing the fixed spoke-engaging jaw or lug and one of the adjustable lugs detached.

The pulley is illustrated as consisting of a rim 1, connected to the attaching plate or disk 2 by transverse webs or spokes 3. The attaching plate 2 is provided with a lug or spoke-engaging jaw 4, rigid thereon, which is recessed or notched, as at 5, to form a seat for one of the spokes 6. About the plate 4 are pairs of slots 7 to receive fastening devices such as shackles or U-shaped, spoke-engaging clips 8, which pass through the openings 9 in the adjustable lugs or jaws 10 and through the slots 7. The spoke clips 8 are each formed with flat seats 11 to engage one face of a spoke, the other face being engaged by either the notch 5 in the lug 4 or a notch 12 in one of the lugs 10.

In order to prevent the jaws and shackles from marring the paint I prefer to interpose a packing consisting of wrapping or strip 13 about the spoke so that when the plate 2 is clamped thereon and secured by the nuts 14 and washer 15, the spoke will not be marred.

The purpose of making one of the jaws or lugs rigid with the ring-shaped plate 2 is to assist in centering the pulley with respect to the wheel. The remaining jaws or lugs are adjustable so that the device is adapted to fit either a wheel with an even number of spokes or a wheel with an uneven number of spokes. Therefore, with the construction shown, the pulley may be applied to any construction of wheel and secured to the shackles as indicated in the drawings.

From the foregoing it will be apparent that the device may be easily applied to and detached from the wheel and that it may efficiently be used as a power transmitting device for transmitting power from a driving wheel, for example, the driven wheel of a motor vehicle, to a source of power consumption.

What I claim and desire to secure by Letters-Patent is:

A pulley having a securing plate with a fixed lug and adjustable lugs thereon, and spoke-engaging shackles co-operating with said lugs.

In testimony whereof I affix my signature.

HALBERT C. WALLACE.